United States Patent [19]
Tamura et al.

[11] Patent Number: 6,052,533
[45] Date of Patent: Apr. 18, 2000

[54] OPTICAL APPARATUS SUCH AS A CAMERA

[75] Inventors: Susumu Tamura, Sagamihara; Takanori Honda, Yokohama, both of Japan

[73] Assignee: Canon Kabushiki Kaisha, Tokyo, Japan

[21] Appl. No.: 08/788,292

[22] Filed: Jan. 24, 1997

[30] Foreign Application Priority Data

Jan. 30, 1996 [JP] Japan .................................. 8-035476
Jan. 30, 1996 [JP] Japan .................................. 8-035477

[51] Int. Cl.[7] .......................... G03B 13/08; G03B 15/03
[52] U.S. Cl. ............................ 396/51; 396/177; 396/386
[58] Field of Search .............................. 396/51, 386, 177

[56] References Cited

U.S. PATENT DOCUMENTS

| | | | |
|---|---|---|---|
| 3,936,849 | 2/1976 | Tsujimoto | 396/51 |
| 4,289,392 | 9/1981 | Kobori et al. | 396/386 |
| 5,041,854 | 8/1991 | Kirigaya | 354/155 |
| 5,245,374 | 9/1993 | Hosokawa et al. | 396/177 |
| 5,260,734 | 11/1993 | Shindo | 354/219 |
| 5,485,241 | 1/1996 | Irie et al. | 354/410 |

FOREIGN PATENT DOCUMENTS

| | | |
|---|---|---|
| 61-61135 | 3/1986 | Japan . |
| 3-171122 | 7/1991 | Japan . |
| 5107595 | 4/1993 | Japan . |
| 5107604 | 4/1993 | Japan . |
| 7-20537 | 1/1995 | Japan . |
| 7-333689 | 12/1995 | Japan . |

*Primary Examiner*—W. B. Perkey
*Attorney, Agent, or Firm*—Fitzpatrick, Cella, Harper & Scinto

[57] ABSTRACT

An optical apparatus is provided with an eyepiece, a focusing screen onto which an image is projected, a reflecting device for reflecting the light from the focusing screen to thereby cause it to enter the eyepiece in order to show the image, an illuminating device for illuminating an eye, an imaging optical system for receiving the light from the eye through the eyepiece and a certain portion of the reflecting device, and forming the image of the eye by the light from the eye, and a photoelectric converter for receiving the image of the eye. The reflecting device comprises a hollow optical part, and the light from the eye passes through the hollow portion and the mirror portion of the optical part.

18 Claims, 4 Drawing Sheets

OPTICAL APPARATUS SUCH AS A CAMERA

BACKGROUND OF THE INVENTION

1. Field of the Invention

This invention relates to an optical apparatus such as a photographic camera, a video camera or an SV camera, and particularly to an optical apparatus such as a photographic camera, a video camera or an SV camera having a function of forming an image of a photographer's eye looking into a finder through the finder, and extracting information relating to the photographer's eye on the basis of the image of the eye.

2. Related Background Art

There have heretofore been proposed various cameras in which a direction of a visual axis (a gazing direction) of a photographer is detected by a visual axis detecting device provided in the camera to thereby detect which area in a field of view of a finder the photographer is observing and various photographing functions such as automatic focus adjustment and automatic exposure adjustment are controlled on the basis of a signal from the visual axis detecting device.

For example, Japanese Laid-Open Patent Application No. 61-61135 proposes a camera designed such that the distance measuring direction of a focus detecting device is mechanically controlled on the basis of an output signal from the visual axis detecting device to thereby adjust a focus state of a phototaking optical system.

Japanese Laid-Open Patent Application No. 3-171122 proposes a camera having a visual axis detecting device designed such that infrared light from light source means provided in a portion of a finder optical system of a single-lens reflex camera is directed onto an optical axis of the finder optical system by the use of a dichroic mirror to thereby project the infrared light onto an eyeball of a photographer observing the field of view of the finder, and the infrared light reflected by a cornea of the eyeball is directed to an outside of a solid pentagonal prism through an eyepiece and an inclined reflecting surface of the solid pentagonal prism and is directed to a light receiving element of the visual axis detecting device.

A method of causing the reflected light from the photographer's eyeball to pass through the eyepiece, a light emergence surface of the solid pentagonal prism and an interior and the inclined reflecting surface thereof and emerge to the outside of the solid pentagonal prism, and thereafter directing it to the light receiving element and detecting it is characterized in that visual axis information can be obtained by a relatively simple construction. However, the method of directing the reflected light from the eyeball passed through the inclined reflecting surface (the final reflecting surface) of the solid pentagonal prism to a visual axis detecting system provided in the upper portion of the camera which is the opposite side to a photo-taking optical system mechanically interferes with a stroboscopic lamp contained in the portion above the solid pentagonal prism. Also, when in order to avoid the mechanical interference at this time, each element for visual axis detection is disposed in a certain degree of spaced apart relationship with the solid pentagonal prism, there arises the first problem that the portion around the solid pentagonal prism becomes bulky and, moreover, the entire camera becomes bulky.

Also, when an image of an eye is formed through the solid pentagonal prism, there has been a second problem that the variation of imaging magnification due to a positional change of the photographer's eye in a direction of an optical axis is not small, and in some cases, the visual axis (gazing) direction cannot be accurately detected.

SUMMARY OF THE INVENTION

A first aspect of the present invention has been made chiefly in view of the above-noted second problem and is an optical apparatus such as one of various cameras having an eyepiece, a focusing screen onto which an image is projected, a reflecting device for reflecting light from the focusing screen to thereby cause it to enter the eyepiece in order to show the image, illuminating means for illuminating an eye, an imaging optical system for receiving light from the eye through the eyepiece and a certain portion of the reflecting device, and forming an image of the eye by the light from the eye, and photoelectric converting means for receiving the image of the eye, the reflecting device comprising a hollow optical part, the light from the eye being designed to pass through the hollow portion and the mirror portion of the hollow optical part, and according to an optical apparatus, the variation in the imaging magnification of the image of the eye due to displacement of the eye with respect to the direction of the optical axis can be made small and the accuracy when the information regarding the eye such as the direction of the visual axis is detected on the basis of the output from the photoelectric converting means is enhanced.

A second aspect of the present invention has been made chiefly in view of the above-noted first problem and is an optical apparatus such as one of various cameras having an eyepiece, a focusing screen onto which an image by a projection optical system is projected, a reflecting device for reflecting the light from the focusing screen to thereby cause it to enter the eyepiece in order to show the image, illuminating means for illuminating an eye, an imaging optical system for receiving light from the eye through the eyepiece and a certain portion of the reflecting device, and forming an image of the eye with light from the eye, and photoelectric converting means for receiving the image of the eye, the imaging optical system being provided with a bending mirror for reflecting light from the eye and bending the optical path thereof toward the optical axis side of the projection optical system, and according to this optical apparatus, the imaging optical system can be disposed in a vacant space in the apparatus to thereby prevent or minimize the balkiness of the optical apparatus.

DESCRIPTION OF THE PREFERRED EMBODIMENTS

Figure 1:
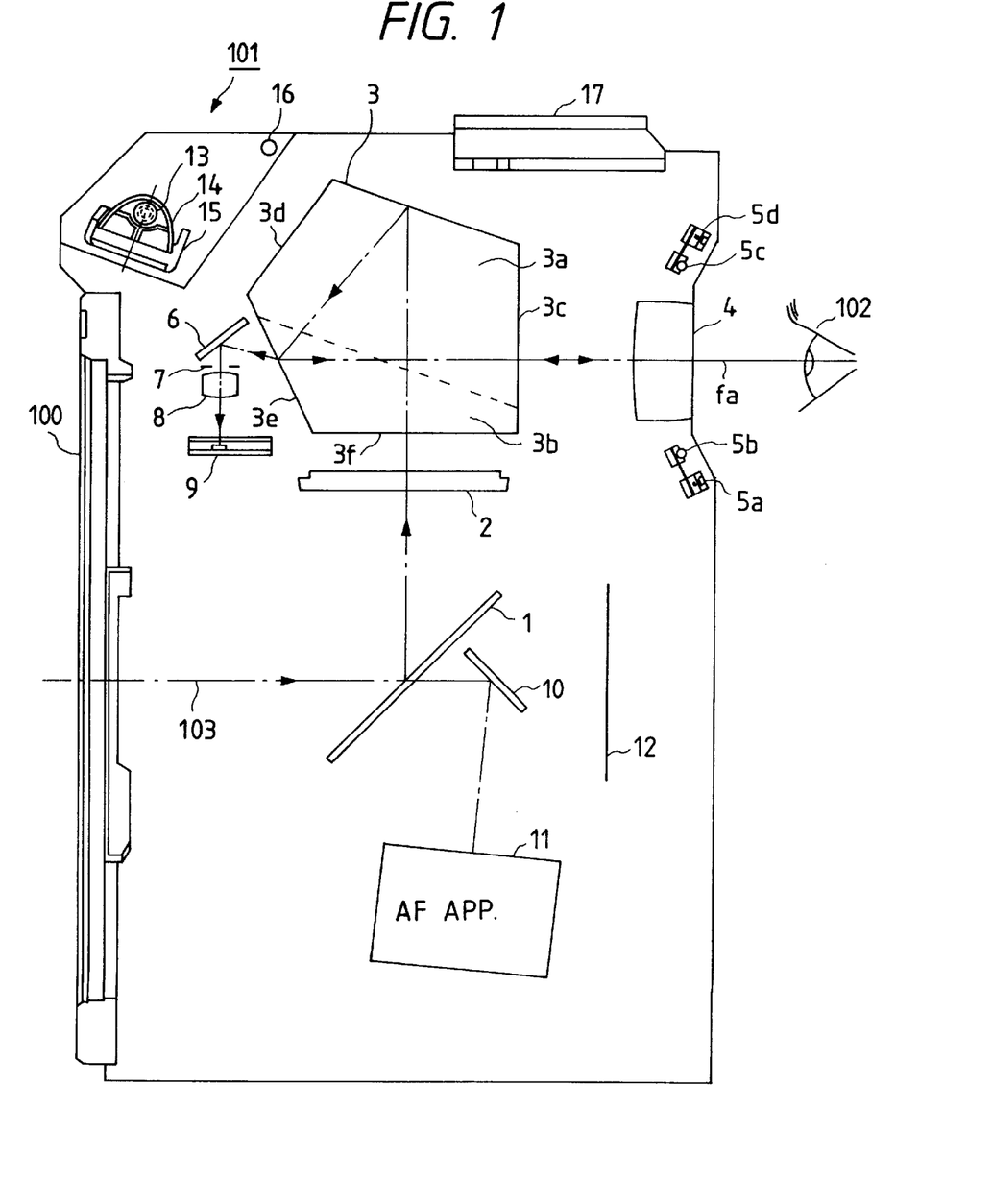
FIG. 1 is a cross-sectional view of the essential portions of Embodiment 1 of the present invention.
Figure 2:
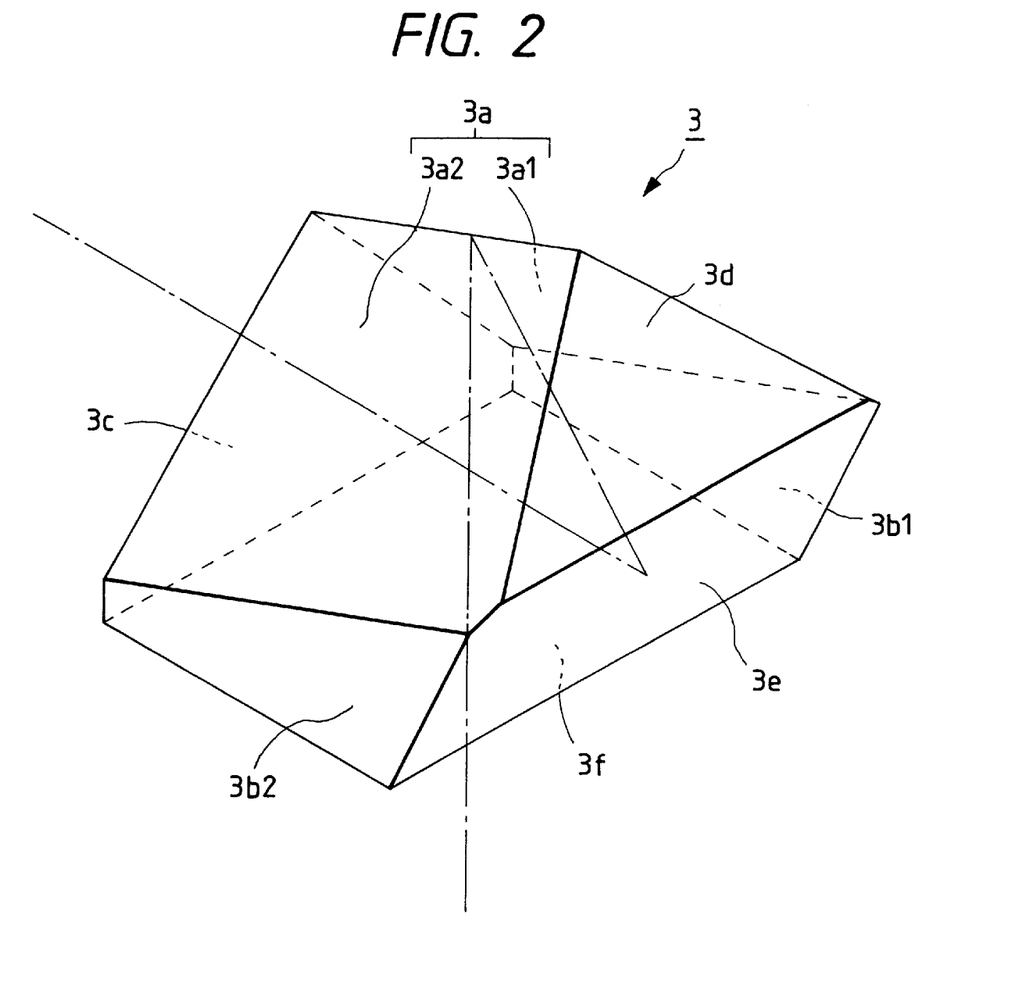
FIG. 2 is an enlarged illustration of the pentagonal prism of FIG. 1.

FIG. 1 is a schematic view of the essential portions of Embodiment 1 when the present invention is applied to a single-lens reflex camera, and FIG. 2 is an enlarged perspective view of the pentagonal prism of FIG. 1.

In these figures, the reference numeral 101 designates the body of a single-lens reflex camera. The reference numeral 100 denotes a mount for interchangeably mounting a phototaking lens, not shown, on the camera body 101, and the reference numeral 1 designates a quick return mirror adapted to be retracted out of an optical path when an object image is exposed on film (photosensitive surface) 12 and to direct an object light from the phototaking lens to a focusing screen 2 of a finder system during the rest of time. The quick return mirror 1 has a half mirror surface. The object image projected by the phototaking lens is formed on the focusing screen 2 via the mirror 1. The reference numeral 3 denotes an optical member for the erection of a finder image which is the object image on the focusing screen. The optical member 3 comprises a solid pentagonal prism as shown in FIG. 2.

The definition of each surface of the pentagonal prism 3 will now be described with reference to FIG. 2. The surface 3a of the pentagonal prism 3 is a roof surface (roof mirror surface) formed by two reflecting surfaces 3a1 and 3a2 arranged at an angle of 90°, surfaces 3b (3b1 and 3b2) are right and left side walls, and a surface 3c is an exit surface for finder light, and provides an entrance surface for infrared light reflected from an eyeball 102, of infrared light emitted from light source means 5 which will be described later, and in the present embodiment, the surface 3c is treated with an anti-reflection coating against infrared light. A surface 3d is a non-functional surface, and a surface 3e is an inclined reflecting surface for making an optical axis fa of an eyepiece 4 and an optical axis 103 of the phototaking lens coincident with each other, and this surface reflects the visible light from the phototaking lens and transmits therethrough the infrared light reflected from the eyeball 102. That is, the surface 3e comprises a dichroic mirror (surface) for reflecting visible light and for transmitting infrared light therethrough. A surface 3f is an entrance surface for a light beam from the object image on the focusing screen 2 (the finder image).

The reference numeral 4 designates an eyepiece, the opposite surfaces of which are provided with anti-reflection film against infrared light. Groups 5a, 5b, 5c and 5d are light source means emitting infrared light, and comprise a plurality of light emitting diodes (IRED's) 5a, 5b, 5c and 5d which are disposed around the eyepiece 4. The light source means 5 illuminates the eyeball 102 of an observer observing a field of view of the finder with infrared light so that the image of the observer's pupil and a Parkinje's image formed by the reflected light on the surface of the cornea can be detected by a light receiving element 9 which will be described later.

The reference numeral 6 denotes a mirror (an optical path bending mirror) which reflects the infrared reflected light from the eyeball 102 passed through the inclined reflecting surface 3e toward the optical axis 103 side of the phototaking lens which is below the camera body 101. The reference numeral 7 designates a stop, the reference numeral 8 denotes a condensing (imaging) lens, and the reference numeral 9 designates the light receiving element (image sensor). These elements 5, 6, 7, 8 and 9 each constitutes an element of visual axis detecting, means.

In the present embodiment, the elements are arranged such that infrared light passed through the inclined reflecting surface 3e is downwardly reflected by the mirror 6, and the elements 6, 7, 8 and 9 for visual axis detection are disposed in a space defined by a plane extended from the surface of the focusing screen 2 and the inclined reflecting surface 3e to thereby achieve effective utilization of the space near the pentagonal prism, thus downsizing the entire apparatus.

The reference numeral 10 denotes a rotatable sub-mirror provided with to the mirror 1 and directing a light beam passed through the light transmitting area (half mirror surface) of the mirror 1, of the light beam from the phototaking lens, to a conventional automatic focus detecting apparatus (AF apparatus) 11. The conventional AF apparatus 11 detects the in-focus state of the phototaking lens with respect to one or more distance measuring areas on the basis of visual axis information from the visual axis detecting means by using a conventional detecting method.

The reference numeral 13 designates the Xe tube of a strobe (lamp) contained in the camera body, the reference numeral 14 denotes a reflector of the stroboscopic lamp, the reference numeral 15 designates the front panel of the strobe, and the reference numeral 16 denotes the hinge shaft of the contained strobe. The reference numeral 17 designates an accessory shoe which is installed on the upper portion of the camera body 101 and on which an extraneous strobe (lamp) is mountable.

In FIG. 1, a light beam from an object passed through the phototaking lens (not shown) is reflected by the quick return mirror 1 and forms an object image on or near the focal plane of the focusing screen 2. The light beam associated with the object image formed on or near the focal plane of the focusing screen 2 is reflected by the roof surface 3a and inclined reflecting surface 3e of the pentagonal prism 3 and enters the photographer's eyeball 102 through the exit surface 3c and the eyepiece 4. Thus, the observer observes the erect image of the object (the finder image) formed on or near the focusing screen 2.

On the other hand, as for the light beam from the object, a light beam passed through the quick return mirror 1 which is the half mirror enters the AF apparatus 11 via the sub-mirror 10. At this time, the in-focus state of the phototaking lens is detected by using the AF apparatus 11 in conjunction with a distance measuring area designated on the basis of the visual axis information from the visual axis detecting means, from among a plurality of distance measuring areas.

On the other hand, when in the above-described construction, the photographer (finder observer) half-depresses a release button, not shown, an infrared light is projected from some of the infrared light emitting diodes 5a to 5d to the photographer's eyeball 102. The infrared reflected light from the eyeball 102 passes through the eyepiece 4 having its opposite surfaces subjected to anti-reflection coating, the exit surface 3c of the pentagonal prism 3, the interior of the pentagonal prism 3 and the inclined reflecting surface 3e of the pentagonal prism 3 in succession and emerges out of the pentagonal prism 3 toward the front of the camera body. The infrared reflected light is then bent toward the optical axis 103 of the phototaking lens (downwardly) by the mirror 6 and forms an eyeball image on the sensor 9 for visual axis detection through stop 7 and condensing lens 8 for visual axis detection. The visual axis position (visual axis information) of the photographer's eyeball 102 is detected on the basis of the output signal from the sensor 9 for visual axis detection. The sensor 9 is made of a two-dimensional CCD or a two-dimensional light receiving element array of another type. The method of detecting the visual axis position may be a conventional one.

Then, the focusing lens of the phototaking lens is driven by the AF apparatus 11 so that the object image lying at the visual axis position in the finder field of view of the finder may be in focus, whereby focusing is effected. When the photographer fully depresses the release button, mirror 1 is retracted from the phototaking light beam and the sub-mirror 10 is also retracted from the phototaking light beam in operative association with the mirror 1. When the mirror 1 is retracted from the phototaking light beam, a shutter curtain, not shown, is opened to thereby effect exposure on film 12. Also, in the present embodiment, phototaking operations e.g., automatic exposure adjustment, etc., other than automatic focus adjustment can be effected by the use of the visual axis information.

Figure 3:
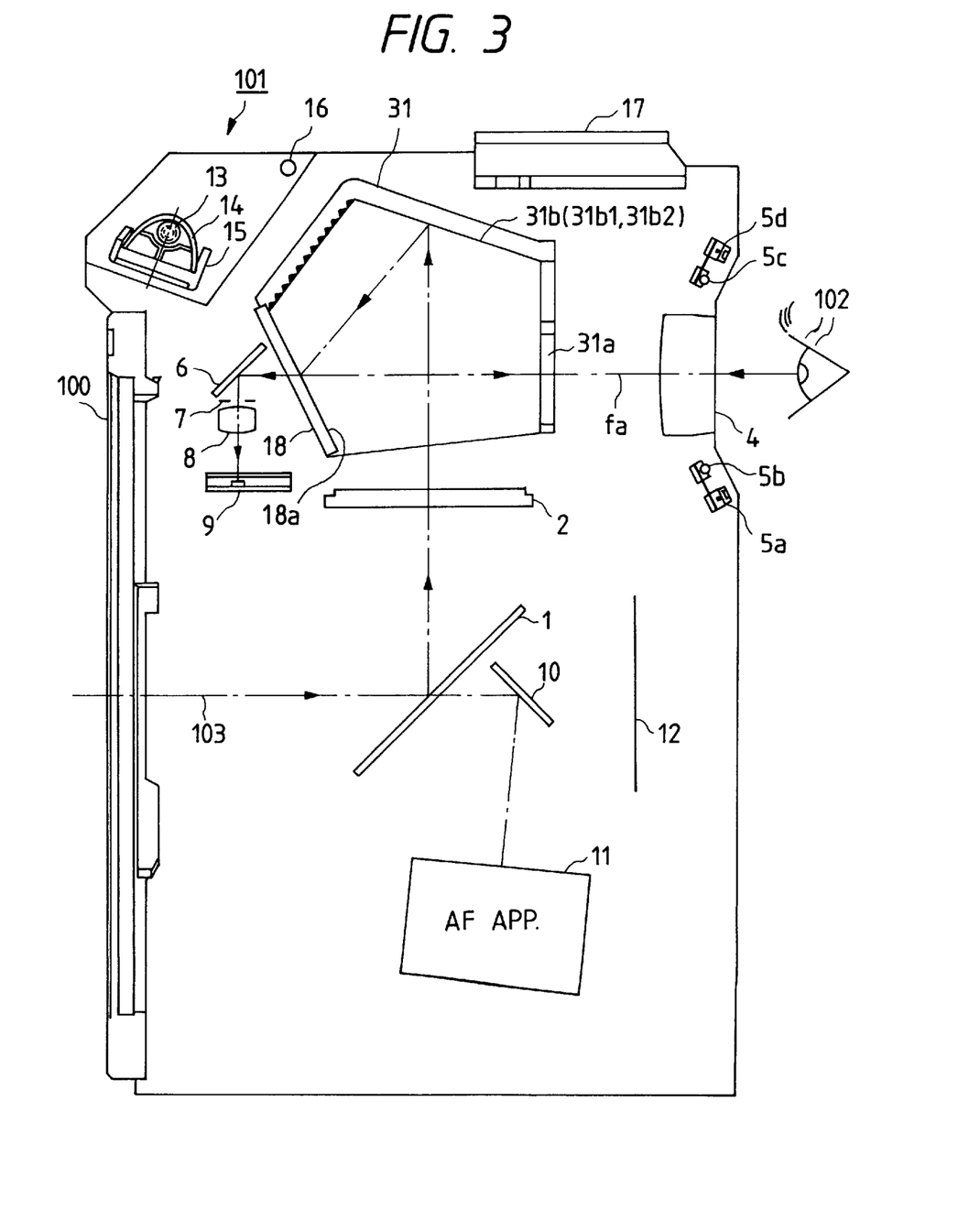
FIG. 3 is a cross-sectional view of the essential portions of Embodiment 2 of the present invention.
Figure 4:
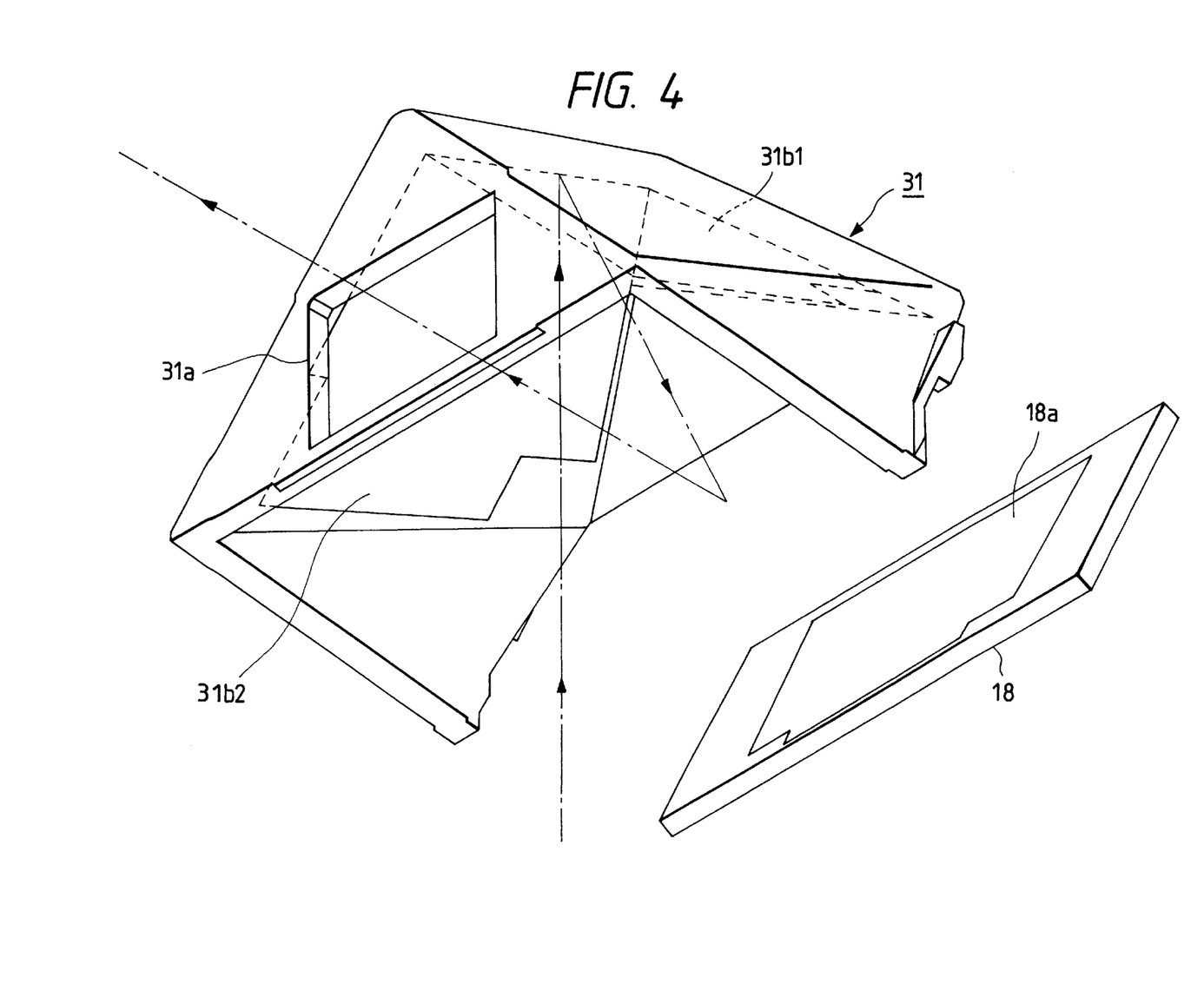
FIG. 4 is an enlarged illustration of the pentagonal prism of FIG. 3.

FIG. 3 is a schematic view of the essential portions of Embodiment 2 of the present invention, and FIG. 4 is an enlarged perspective view of the pentagonal prism of FIG. 3.

Embodiment 2 differs from Embodiment 1 of FIG. 1 in that an optical member 31 for forming an erect image of an object image formed on the focusing screen (finder image) 2 is comprised of a hollow roof mirror, a reflecting member 18 comprising a plane parallel plate having an inclined reflecting surface 18a, and an aperture 31a for light emergence, and is the same as Embodiment 1 in the other points of construction and operation. Accordingly, these same points of construction and operation need not be described.

The construction of the optical member 31 in Embodiment 2 will now be described.

The optical member 31 has a roof mirror (roof surface) 31b comprising two reflecting members 31b1 and 31b2 for reflecting a light beam from the object image on the screen 2 and converting it reversely into left and right beams, a reflecting member 18 having an inclined reflecting surface (effective reflecting surface) 18a which is the last reflecting surface inclined with respect to the finder optical axis fa to reflect the reflected light from the roof mirror 31b in the finder observation direction, and a transparent plane parallel plate 31a for light emergence of which the light entrance and exit surfaces are provided with anti-reflection film.

The inclined reflecting surface 18a comprises a dichroic mirror (surface) for reflecting visible light and for transmitting infrared light therethrough. The reflecting member 18 is mounted in the front opening portion of the optical member 31. In the present embodiment, the roof mirror 31b (31b1 and 3b2) and the reflecting member 18 are constructed discretely from each other to thereby enable a dichroic film to be deposited by evaporation singly on the inclined reflecting surface 18a.

In Embodiment 2, the optical member 31 for erection of the finder image is made as a hollow pentagonal prism using the hollow roof mirror 31b and an inclined reflecting mirror 18 comprising a glass plate formed with deposited film having a dichroic mirror characteristic, whereby the following effects are obtained.

Since there is no undesirable refracting action of the reflected light from the eyeball due to the inclination error of the light emergence portion (aperture 31a) of the optical member 31, visual axis detection accuracy is good. Also, the light only passes therethrough, and therefore, it is not necessary to provide as anti-reflection film.

The length of the optical path to the imaging lens of the optical system for visual axis detection as it is converted in terms of optical air can be secured greatly as compared with a solid pentagonal prism. Accordingly, when the imaging magnification on the light receiving element is made the same, the change in the imaging magnification by the displacement of the eye to be examined in the direction of the optical axis is small and highly accurate visual axis detection can be effected.

In the solid pentagonal prism, when a light beam is taken out from the inclined reflecting surface thereof which is the last reflecting surface, the light beam is refracted by the inclined reflecting surface, and therefore, chromatic aberration and coma which cannot be neglected are created and thus, a take-out prism becomes necessary to correct these. In contrast with this, the inclined reflecting mirror is provided by a glass plate which is a plane parallel plate and therefore, these aberrations generally are not created and the take-out prism is unnecessary.

When a solid pentagonal prism is used and an inclined reflecting surface which is the last reflecting surface thereof is made into a dichroic mirror surface, the inclined reflecting surface is masked when silver is deposited by evaporation on the roof surface, and the other surface is masked when deposited film (dichroic film) having a dichroic mirror characteristic is formed on the inclined reflecting surface, and this is cumbersome. In contrast with this, in the case of a system including a hollow roof mirror and a glass plate, the deposition by evaporation of film having a dichroic mirror characteristic can be effected singly by the glass plate for the inclined reflecting mirror, and manufacture becomes easy.

Also, the present invention can adopt a construction in which a plane parallel plate is provided in lieu of the aperture 31a. In this case, anti-reflection coating is necessary for surfaces of the plane parallel plate, but there is the advantage that no dust comes into the hollow pentagonal prism.

When as in Embodiments 1 and 2 described above, the eyeball of the observer looking into the field of view of the finder is illuminated with infrared light and the reflected infrared light from the eyeball is directed to the light receiving element through a portion of the optical member for the erection of the finder image and visual axis information is to be detected by the use of eyeball image information obtained from the output of the light receiving element, elements such as the optical member for the erection of the finder image and the eyeball image detecting system are appropriately constructed, whereby there can be achieved a camera having visual axis detecting means for detecting visual axis information easily and highly accurately while the entire apparatus is simplified, thereby effecting various kinds of phototaking operations.

Also, design is made such that the reflected light passed through the inclined reflecting surface of the solid pentagonal prism or the inclined reflecting surface 18a of the reflecting mirror 18 is reflected toward the phototaking optical axis (downwardly) by the mirror 6 and is imaged on the light receiving element 9 and therefore, it becomes easy to dispose the contained stroboscopic lamp forwardly of the inclined reflecting surface of the solid pentagonal prism or the inclined reflecting surface of the reflecting mirror. Also, without caring about the vertex of the roof surface or the inclined reflecting surface of the solid pentagonal prism or the protrusion of the hollow roof mirror or the reflecting mirror 18, other optical systems can be disposed near it and therefore, the distance between the eyepiece and the mirror 6 can be set short, and the optical system can be made bright and accuracy can be heightened.

Also, when the infrared reflected light from the eyeball is received by the light receiving element for visual axis detection, any reduction in quantity of light and the creation of ghost can be prevented by providing anti-reflection coating not only on the opposite surfaces of the eyepiece but also on the surfaces of the other optical elements, and thus there is obtained the effect that a highly accurate visual axis detecting apparatus can be realized.

What is claimed is:

1. An optical apparatus comprising:

an eyepiece;

a focusing screen onto which an image is projected;

illuminating means for illuminating an eye with infrared light;

a reflecting device having a hollow portion and including a roof type mirror and a dichroic mirror that reflects visible light and transmits infrared light therethrough, said reflecting device reflecting light incident thereon from said focusing screen so that the light enters said eyepiece and the image is viewable therethrough, the dichroic mirror of said reflecting device including a flat glass plate having a film vapor deposited thereon and transmitting infrared light reflected from the eye and incident on the dichroic mirror through the eyepiece and the hollow portion of the reflecting device;

an imaging optical system that receives infrared light incident thereon from the eye through said eyepiece and the dichroic mirror of said reflecting device, and forms an image of the eye using the infrared light reflected from the eye; and photoelectric converting means for receiving the image of the eye.

2. An optical apparatus according to claim 1, wherein said illuminating means is provided proximate said eyepiece.

3. An optical apparatus according to claim 1, wherein said illuminating means comprises a plurality of light emitting diodes.

4. An optical apparatus according to claim 1, wherein said imaging optical system comprises a bending mirror that reflects infrared light incident thereon from the eye and transmitted through said dichroic mirror, and a condensing lens that receives infrared light reflected by said bending mirror.

5. An optical apparatus according to claim 4, wherein said bending mirror bends an optical path of the infrared light reflected by the eye and transmitted through the dichroic mirror in a direction toward a projection optical system that projects the image onto said focusing screen.

6. An optical apparatus according to claim 1, wherein said eyepiece has an anti-reflection film that prevents reflection of infrared light.

7. An optical apparatus according to claim 1, wherein said reflecting device comprises a transparent plate disposed in the optical path of light from said focusing screen that is reflected by said dichroic mirror, and wherein infrared light reflected by the eye passes through said transparent plate, said hollow portion and said dichroic mirror and enters said imaging optical system.

8. An optical apparatus according to claim 7, wherein said transparent plate has an anti-reflection film that prevents reflection of infrared light.

9. An optical apparatus according to claim 1, wherein said reflecting device is a hollow pentagonal prism.

10. An optical apparatus according to claim 1, wherein the direction of the visual axis of the eye is detected using an output of said photoelectric converting means, and said optical apparatus is controlled in accordance with a result of the detection.

11. An optical apparatus comprising:

an eyepiece;

a focusing screen onto which an image is projected by a projection optical system;

illuminating means for illuminating an eye with light;

a reflecting device having a hollow portion and including a roof type mirror and a dichroic mirror that reflects visible light and transmits infrared light therethrough, said reflecting device reflecting light incident thereon from said focusing screen so that the light enters said eyepiece and the image is viewable therethrough, the dichroic mirror of said reflecting device including a flat glass plate having a film vapor deposited thereon and transmitting infrared light reflected from the eye and incident on the dichroic mirror through the eyepiece and the hollow portion of the reflecting device;

an imaging optical system that receives infrared light incident thereon from the eye through said eyepiece and the dichroic mirror of said reflecting device, and forms an image of the eye using the infrared light reflected from the eye, said imaging optical system comprising a bending mirror that reflects light incident thereon and bends the optical path of the light in a direction toward an optical axis of the projection optical system;

photoelectric converting means for receiving the image of the eye; and a strobe device disposed at a side of said reflecting device opposite said eyepiece and on a side of said bending mirror opposite the optical axis of the projection optical system.

12. An optical apparatus according to claim 11, wherein said imaging optical system comprises a condensing lens that condenses light reflected from said bending mirror onto said photoelectric converting means.

13. An optical apparatus according to claim 11, wherein said illuminating means is disposed proximate said eyepiece.

14. An optical apparatus according to claim 13, wherein said illuminating means comprises a plurality of light emitting diodes.

15. An optical apparatus according to claim 11, wherein said eyepiece has an anti-reflection film that prevents reflection of infrared light.

16. An optical apparatus according to claim 11, wherein said reflecting device comprises a transparent plate disposed in the optical path of light reflected from said dichroic mirror, and infrared light reflected by the eye passes through said transparent plate, said hollow portion and said dichroic mirror and enters said imaging optical system.

17. An optical apparatus according to claim 16, wherein said transparent plate has an anti-reflection film that prevents reflection of infrared light.

18. An optical apparatus according to claim 11, wherein the direction of the visual axis of the eye is detected using the output of said photoelectric converting means, and said optical apparatus is controlled in accordance with the result of the detection.

* * * * *

UNITED STATES PATENT AND TRADEMARK OFFICE
CERTIFICATE OF CORRECTION

PATENT NO.  : 6,052,533

DATED       : April 18, 2000

INVENTOR(S) : SUSUMU TAMURA, ET AL.                    Page 1 of 2

It is certified that error appears in the above-identified patent and that said Letters Patent is hereby corrected as shown below:

On the Title Page

At [56] References Cited

FOREIGN PATENT DOCUMENTS

"5107595" should read --5-107595--.
    "5107604" should read --5-107604--.

U.S. PATENT DOCUMENTS

"3,936,849 2/1976" should read --3,936,849 2/1975--.

After Item [22] Insert

--[*] Notice:   This patent issued on a continued prosecution application filed under 37 CFR 1.53(d), and is subject to the twenty year patent term provisions of 35 U.S.C. 154(a)(2). --

UNITED STATES PATENT AND TRADEMARK OFFICE
CERTIFICATE OF CORRECTION

PATENT NO.   : 6,052,533
DATED        : April 18, 2000
INVENTOR(S)  : SUSUMU TAMURA, ET AL.

It is certified that error appears in the above-identified patent and that said Letters Patent is hereby corrected as shown below:

Column 3

Line 66, "to" should be deleted.

Column 5

Line 5, "as" should read --an--.

Signed and Sealed this

Seventeenth Day of April, 2001

Attest:

NICHOLAS P. GODICI

*Attesting Officer*    Acting Director of the United States Patent and Trademark Office